Feb. 22, 1966  R. S. HINSEY  3,236,118
MECHANISM CONTROL
Filed April 16, 1962
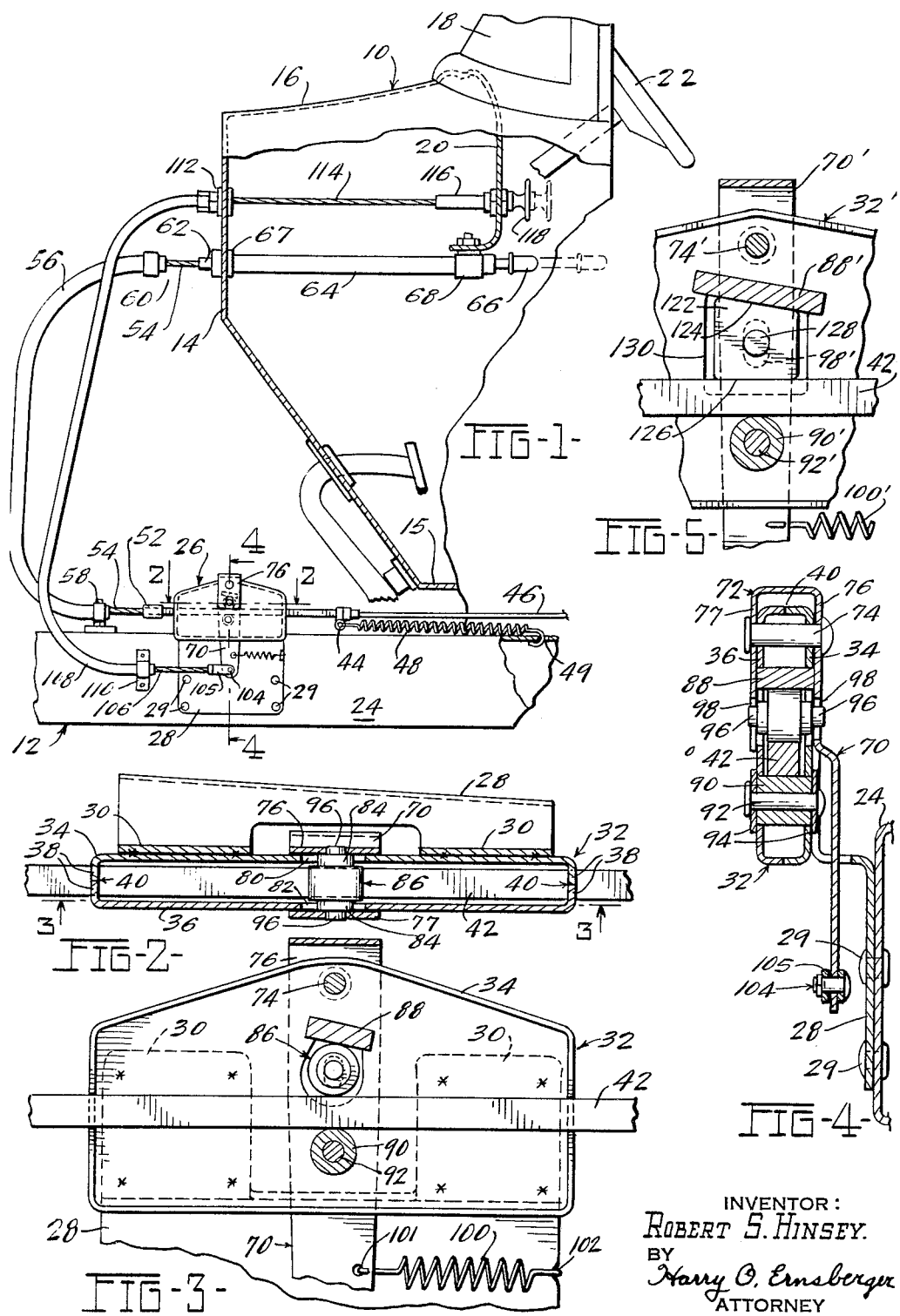
INVENTOR:
ROBERT S. HINSEY.
BY
Harry O. Ernsberger
ATTORNEY

United States Patent Office 3,236,118
Patented Feb. 22, 1966

3,236,118
MECHANISM CONTROL
Robert S. Hinsey, Toledo, Ohio, assignor to Universal American Corporation, New York, N.Y., a corporation of Delaware
Filed Apr. 16, 1962, Ser. No. 187,524
5 Claims. (Cl. 74—502)

This invention relates to mechanism control and more especially to a control means or device for actuating or controlling the emergency or parking brakes of an automotive vehicle.

The invention embraces the provision of an apparatus embodying a longitudinally movable means connected with the parking brakes of a vehicle and adapted to be actuated or controlled by the operator of the vehicle, the apparatus including a means engageable with the longitudinally movable means for retaining the latter in adjusted or brake setting positions and means for releasing the longitudinally movable means from brake setting position.

An object of the invention is the provision of actuating and controlling mechanism for the emergency or parking brakes of a vehicle, the mechanism incorporating an elongated member movable in a rectilinear direction connected with the parking brakes of the vehicle in combination with means arranged to be wedgingly or frictionally engaged with the elongated member for retaining the latter in brake setting or adjusted positions by operator actuated means, the mechanism including means connected with the wedging means for moving the latter out of member engaging position to effect a release of the parking brakes.

Another object of the invention resides in the provision of a control unit especially for use with parking brakes of a vehicle which is adapted to be secured to a portion of the vehicle preferably remote from the operator's compartment and embodying means connected with the parking brakes for frictionally retaining the same in set position wherein actuating and release means for the control unit are disposed in the vehicle operator's compartment.

Another object of the invention resides in a control unit arranged to retain the parking brakes of a vehicle in brake set position which is adapted to be secured to the frame or other portion of the vehicle remote from the operator's compartment in combination with actuating and release means in the operator's compartment connected with the control unit by a flexible means rendering the unit particularly usable in vehicles wherein the operator's compartment or cab is rendered tiltable with respect to the frame whereby the flexible actuating and control means is rendered movable with the cab without affecting or impairing the control unit.

Another object of the invention is the provision of mechanism control means especially adaptable for controlling the parking brakes of a vehicle wherein the mechanism control embodies an elongated member movable in a rectilinear path adapted to be connected with the brakes and friction means cooperating with cam or abutment means for retaining the member in various positions of adjustment in combination with actuating and release means for the control mechanism within convenient access of the vehicle operator.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of a portion of the vehicle embodying a form of the invention utilized for actuating or controlling the parking brakes of a vehicle wherein the unit is disposed remote from the operator's compartment with the actuating and release means therefor disposed in the operator's compartment;

FIGURE 2 is an enlarged longitudinal sectional view taken substantially on the line 2—2 of FIGURE 1;

FIGURE 3 is a sectional view taken substantially on the line 3—3 of FIGURE 2;

FIGURE 4 is a vertical sectional view taken substantially on the line 4—4 of FIGURE 1, and FIGURE 5 is a fragmentary detail sectional view illustrating a modified form of friction locking means for retaining the brakes in set position.

The illustrated forms of the invention are particularly usable for actuating and controlling the emergency or parking brakes of a vehicle for installations where the operator's compartment is fixed to the chassis frame or is rendered tiltable as in certain types of conventional truck constructions.

Referring to the drawings in detail, the operator's compartment or cab 10 may be fixedly mounted upon the chassis frame 12 of the vehicle or the same may be arranged to be tilted with respect to the frame 12. The operator's compartment construction is inclusive of a dashboard or firewall 14, a floorboard construction 15, a cowl portion 16, a windshield 18, an instrument panel 20 and a steering wheel 22, all of these components being of conventional construction.

The chassis frame of the vehicle is inclusive of side frame members, one of which is illustrated at 24 and, in the embodiment illustrated, the control means or unit 26 for the parking brakes of the vehicle is preferably carried upon one of the frame members 24 or may be mounted on another member of the vehicle. The mechanism control of the invention is inclusive of a support means preferably in the form of a plate 28 which, as illustrated in FIGURE 4, may be secured to a vehicle frame member 24, by means of rivets 29 or other securing means.

In the embodiment illustrated in FIGURES 1 through 4, the plate 28 is provided with offset portions or pads 30 upon which is mounted a housing construction 32 secured to the portions 30 by spot welding 33. The housing 32 preferably comprises two matched or mated sheet metal sections 35 and 36 having laterally extending peripheral flanges 38 which abut at a junction line 40. The sections 34 and 36 may be welded along the juncture line 40. Disposed longitudinally of the housing 32 and extending through openings in the end flanges of the housing is an elongated member, rod or means 42 movable in a rectilinear direction or path.

The means or rod 42 is adapted to be connected with the parking brakes of the vehicle. In the arrangement illustrated in FIGURE 1, a coupling member 44 is connected to the rear end of member 42, the coupling member 44 being connected with a cable 46 or other means connected with the parking brakes of the vehicle. A contractile spring 48, connected with the coupling 44, is hooked into an opening 49 in the frame member 24 and provides a resilient biasing means urging the member 42 toward brake release position.

It is to be understood that the member 42 may be fashioned as a continuation of the cable or means 46 connected with the brakes, if desired. The brakes are actuated to set position by forward or left-hand movement of the member 42 in a rectilinear direction, as viewed in FIGURE 1, by operator control actuating means disposed in the operator's compartment 10. As illustrated in FIGURE 1, the forward or left-hand end of the member 42 is secured by a coupling 52 with a flexible cable 54 slidable in a protective tubular sheath 56, the end of the sheath adjacent the coupling 52 being secured to a bracket 58 mounted on frame member 24 and the opposite end of the sheath secured to a bracket 60 carried by the firewall 14.

The upper end of the actuating cable 54 is connected with an actuator which, in the form illustrated, is a pull rod 62 supported in a tubular guide member 64, the rod being equipped with a manipulating means or handle 66.

One end of the supporting means or tube 64 extends through a grommet 67, the other end being supported from the instrument panel 20 by a bracket 68. The setting of the parking brakes is effected by exerting a pulling force on the rod 62 in a right-hand direction as viewed in FIGURE 1, this movement being transmitted by the flexible cable 54 to the means or member 42.

Means is arranged within the housing 32 for holding or retaining the rectilinearly movable means or member 42 in adjusted or brake setting positions. A lever 70 preferably formed of sheet metal has a U-shaped portion 72, the parallel legs or sections 76 and 77 thereof straddling the upper central region of the housing 32, the lever being pivotally supported upon a rivet or pin 74 extending through openings in the walls of mating sections 34 and 36 of the housing and through openings in the leg portions 76 and 77.

The housing walls provided by the sections 34 and 36 are respectively formed with openings 80 and 82 to accommodate shoulder portions 84 formed on a locking means 86 which is adapted for frictional locking engagement with a surface of the longitudinally extending member or rod 42. In the form shown in FIGURES 2 and 3, the locking means is in the form of a roller. Mounted in rectangular openings formed in the side walls of sections 34 and 36 is a member 88 which, as shown in FIGURE 3, has a major surface inclined or angularly arranged with respect to the adjacent surface of the member 42.

The member 88 forms a cam means in that its lower surface converging toward the adjacent surface of member 42 provides for a wedging or camming engagement of the locking member 86 therewith. Disposed beneath the member or bar 42 is a member preferably in the form of a sleeve or roller 90 which is supported upon a rivet or pin 92 extending through aligned openings in washers 94, as shown in FIGURES 3 and 4. The member, sleeve or roller 90 forms an anvil or abutment means engagable with the member 42 opposite the region of engagement of the friction member or roller 86 to provide a means resisting the downward thrust of the member 86 when the latter is engaged with member 42 under the influence of the inclined or cam surface of the abutment block 88.

The included angle of the lower surface of the abutment with the upper surface of member 42 must be a locking angle, viz. less than eleven degrees. The shoulder portions 84 of the locking member 86 are provided with projections or tenons 96 and the leg portions 76 and 77 of the lever 70 are provided with slots 98 to accommodate the projections or tenons 96. The slots 98 are elongated in a direction normal to the plane of the upper surface of member 42 so as to facilitate slight vertical movement of the locking member or roller 86 in moving into and away from frictional locking engagement with the member 42.

The lever 70 is biased in a counterclockwise direction, as viewed in FIGURE 3, about the axis of the rivet 74 under the influence of a resilient means or contractile spring 100, one end 101 of the spring being engaged in an opening in the lever and the opposite end being hooked over a recessed edge portion 102 as shown in FIGURE 3. Thus the locking means 86 is normally resiliently biased toward a locking position between the angularly arranged surface or cam provided by the abutment block 88 and the member 42.

It is to be understood that the member 42 could be a continuation of the cable 46 connected with the parking brakes of the vehicle and that the locking means 86 would, in such arrangement, directly engage the cable.

A release means is connected with the lever 70 and is adapted to be controlled by the operator. Pivotally secured to the depending end of the lever 70 by a pivot 104 is a clevis 105 which is secured to an end of a control member, wire or cable 106, the control member 106 being enclosed in a casing or sheath 108.

The lower end of the sheath is secured by a bracket 110 to the frame member 24 or other suitable support, the upper end of the sheath being secured to a grommet or anchor member 112 carried by the firewall 14. The member or wire 106 is connected with a member 114 which extends through a guide 116 secured to the instrument panel 20. A means or element 118 is secured to member 114 for manipulating the level 70.

In the operation of the arrangement shown in FIGURES 1 through 4, the operator, desiring to set the parking brakes, exerts a pulling force on the grip member 66 to move the rod or member 62 in a right-hand direction as viewed in FIGURE 1. Through the connection of the member 62 with the cable 54, the cable is thereby moved through the sheath 56 and the member 42 moved in a left-hand direction as viewed in FIGURES 1 through 3 until the parking brakes are in a set position. As the locking means 86 is at all times biased by the spring 100 into locking engagement between the abutment or cam member 88 and the member 42, such locking or wedging engagement of the locking means 86 retains the brakes in set position.

When it is desired to release the brakes, the operator grasps the manipulating button 118 to move member 114 in a right-hand direction, as viewed in FIGURE 1, which movement is transmitted through the member or wire 106 to the lever 70, causing the lever to be swung about its pivot 74 in a clockwise direction. When the lever is moved in this direction, edge walls defining the elongated openings 98 in the legs 76 and 77 of the lever 70 move the tenons 96 on the roller or locking means 86 in a left-hand direction as viewed in FIGURES 2 and 3, thus releasing the locking means or roller 86 from locking or wedging engagement with the abutment 88 and the member 42.

This release of the locking means permits the member or rod 42 and the cable 46 to be moved in a rectilinear direction to a position releasing the brakes under the influence of the spring 48 and the conventional brake springs (not shown). This movement also causes the cable 54 and the actuating member 62 to be returned to their normal or brake release positions.

A modified form of locking means is illustrated in FIGURE 5. In this arrangement the side walls of the housing 32' are provided with openings to receive and support an abutment or cam member 88'. The member 42' is connected with the parking brake mechanism in a manner herein described in connection with the form of the invention shown in FIGURES 1 through 4, a roller or sleeve 90' mounted upon a rivet 92' serving as a means to resist thrust of the locking means engagable with the member 42'.

In the arrangement shown in FIGURE 5, the locking means is in the form of a wedge shaped member 122 having its upper surface 124 adapted for frictional or camming engagement with a lower surface of the abutment 88', a second surface 126 on the locking means or wedge 122 being arranged for frictional or locking engagement with the bar 42'.

The lever 70', pivoted upon a rivet or pin 74', is fashioned with elongated openings 98' which receive tenons or projections 128 on the locking member 122 in the same manner that the tenons or projections 96 are received in the openings 98 as shown in FIGURE 4. The side walls of the housing 32' are provided with openings 130 to accommodate the locking means or wedge 122, the openings being of sufficient dimension to permit relative movement of the locking means 122 with respect to the abutment 88'.

The operation of the locking means 122 is substantially the same as the operation of the locking means 86 hereinbefore described. The included angle of the lower surface of the abutment or cam 88' with the plane of the upper surface of the member 42' must be a "locking" angle and should be less than 11° in order that the friction between the locking means 122 with the abutment 88' and the member 42' will be adequate to prevent relative slippage of the member 42'. The locking member or wedge member 122' is biased toward a locking position, that is, in a right-hand direction as viewed in FIGURE 5, under the influence of the spring 100'.

When the member 42' is moved in a left-hand direction to set the brakes, the action of the locking means or wedge 122 with the abutment 88' and the member 42' frictionally retains the member 42' in its adjusted position setting the brakes. When it is desired to release the brakes, the lever 70' is swung in a clockwise direction to move the locking means 122 out of locking engagement with the abutment 88' and the member 42' to thereby release member 42' for movement to brake release position.

It is to be understood that the actuating means for setting the brakes through movement of the member 42 or 42' may be of the foot-operated type such as shown in my Patent 3,011,361 or similar actuating mechanisms. The release means connected with the lever 70 may be power actuated as by vacuum actuated means such as that shown in Martin Patent 2,725,128 or Martin Patent 2,867,310.

Through the arrangement of flexible cables or wires 54 and 106 and the flexible sheaths 56 and 108, the cab or operator's compartment construction 10 may be tilted forwardly as in certain conventional truck constructions, the flexibility of the above-mentioned components accommodating the tilting action without affecting the brake control unit 26.

It is apparent that, within the scope of the invention, modifications and different arrangements may be made other than as herein disclosed, and the present disclosure is illustrative merely, the invention comprehending all variations thereof.

I claim:

1. Apparatus for controlling parking brakes of a vehicle having an operator's compartment including, in combination, a control unit comprising a housing carried by the vehicle and disposed outside of the operator's compartment, a rod extending through the housing and arranged to be connected with the parking brakes, means in said housing providing a surface inclined to the direction of movement of said rod, a relatively movable locking element in said housing and disposed for locking between the inclined surface and said rod to retain the parking brakes in set position, actuator means controlled from the operator's compartment for actuating the rod toward brake setting position, a flexible cable connecting said actuator means with the rod release control means accessible in the operator's compartment for withdrawing the locking means from locking engagement with the rod and inclined surface to release the parking brakes, said release control means including a flexible cable adapted to transmit movement of the release control means to the member locking element.

2. Apparatus for controlling parking brakes of a vehicle having an operator's compartment including, in combination, a control unit comprising a support means including a housing carried by the vehicle having spaced wall portions disposed outside of the operator's compartment, an elongated operating member extending between the wall portions arranged to be connected with the parking brakes, an abutment block mounted by the housing having a surface inclined with respect to said elongated member, a locking element disposed for locking between the inclined surface and the elongated member and movable to member locking and release positions, a lever fulcrumed on the housing and having operative connection with the locking element, said elongated member being connected with an operator-controlled actuating means disposed in the operator's compartment, resilient means engaging the lever and normally biasing the locking element toward locking position, and control means in the operator's compartment for effecting movement of the lever to withdraw the locking element out of locking engagement with the elongated member and abutment block to release the parking brakes.

3. Apparatus for controlling parking brakes of a vehicle having an operator's compartment including, in combination, a control unit comprising a housing supported on the vehicle remote from the operator's compartment, an elongated member extending through the housing arranged to be connected with the parking brakes and arranged for rectilinear movement in the direction of its length, an abutment supported by the housing having a surface inclined to the direction of movement of said member, a relatively movable locking element disposed for locking between said inclined surface and the elongated member, means journally supported on the housing and having operative engagement with the locking element, resilient means normally biasing the locking element toward member-locking position, an actuator for said elongated member disposed in the operator's compartment, and means controlled from the operator's compartment connected with said journally supported means for releasing the locking element from locking engagement with the elongated member and the abutment to release the parking brakes.

4. Apparatus for controlling parking brakes of a vehicle having an operator's compartment including, in combination, a control unit comprising a housing supported on the vehicle remote from the operator's compartment, an elongated member extending through the housing arranged to be connected with the parking brakes and movable in the direction of its length, abutment means supported by the housing having a surface inclined to the direction of movement of said member, a relatively movable locking element disposed for locking between said inclined surface and the elongated member, a lever pivotally supported on the housing and having operative engagement with the locking element, resilient means normally biasing the locking element toward member locking position, an actuator for said elongated member disposed in the operator's compartment, a flexible cable connecting the actuator with the elongated member, a release control operable independently of the actuator and accessible in the operator's compartment, and flexible means connecting the release control with said lever for releasing the locking element from locking engagement with the elongated member to release the parking brakes.

5. Apparatus for controlling parking brakes of a vehicle having an operator's compartment including, in combination, a control unit comprising a walled housing supported remote from the operator's compartment, an elongated member disposed in the housing and extending through openings in the housing wall and arranged to be connected with the parking brakes and movable in the direction of its length, an abutment block supported by the housing having a surface inclined to the direction of movement of the elongated member, a relatively movable locking roller disposed for locking between said inclined surface and the elongated member, a lever pivotally supported on the housing and having operative engagement with the locking roller, resilient means normally biasing the locking roller toward member-locking position, an actuator for said elongated member disposed in the operator's compartment, and release means operable independently of the member actuator and accessible in the operator's compartment connected with said lever for releasing the locking roller from locking engagement with the elongated member and inclined surface to release the parking brakes.

(References on following page)

References Cited by the Examiner

UNITED STATES PATENTS

| | | | |
|---|---|---|---|
| 1,876,498 | 9/1932 | Hawkins | 74—539 |
| 2,014,300 | 9/1935 | Strobridge | 74—539 X |
| 2,117,925 | 5/1938 | Van Meter | 74—531 X |
| 2,169,888 | 8/1939 | Snell | 74—531 |
| 2,558,558 | 6/1951 | Hinsey | 74—531 |
| 2,664,014 | 12/1953 | Feemster et al. | 74—502 |
| 2,881,637 | 4/1959 | Hinsey | 74—539 |
| 3,143,192 | 8/1964 | Buchanan | 74—501 X |

BROUGHTON G. DURHAM, *Primary Examiner.*